Feb. 15, 1966     D. B. SPALDING     3,234,733

PLANT FOR PRODUCING A FLOW OF PRESSURIZED GAS

Filed May 1, 1963

United States Patent Office 3,234,733
Patented Feb. 15, 1966

3,234,733
PLANT FOR PRODUCING A FLOW OF
PRESSURIZED GAS
Dudley Brian Spalding, 2 Vineyard Hill Road,
Wimbledon, London SW. 19, England
Filed May 1, 1963, Ser. No. 277,201
Claims priority, application Great Britain, May 17, 1962,
19,147/62
4 Claims. (Cl. 60—35.6)

This invention relates to plant for producing a flow of gas, and to stabilization and propulsion plant for aircraft capable of taking off vertically or substantially vertically from the ground.

The development of aircraft capable of taking-off from the ground vertically or substantially vertically has given rise to a need for stabilizing devices. It has been proposed to ensure adequate aircraft stability by the use of control-jet nozzles at appropriate positions on the aircraft structure. A carefully metered flow of air or other gas passes through one or more of these nozzles to maintain the stability of the aircraft. Air for these nozzles can be bled directly from the compressor of the aircraft main propulsion gas-turbine engine but this is not always entirely satisfactory in practice.

According to the present invention, a stabilization and propulsion plant for an aircraft includes a propulsion gas turbine unit incorporating compression means, a control apparatus incorporating a sensing mechanism to detect instability in aircraft flight attitude, ducting to lead a quantity of compressed fluid from the compression means to the control apparatus, a sliding vane air motor, ducting to lead a metered quantity of pressurized fluid from the control apparatus to the sliding vane air motor, an axial-flow fan, a shaft coupling the sliding vane air motor and the axial-flow rotary fan, at least one nozzle to provide stability control for the aircraft and means to lead pressurized air from the axial-flow fan to the nozzle.

Figure 1:
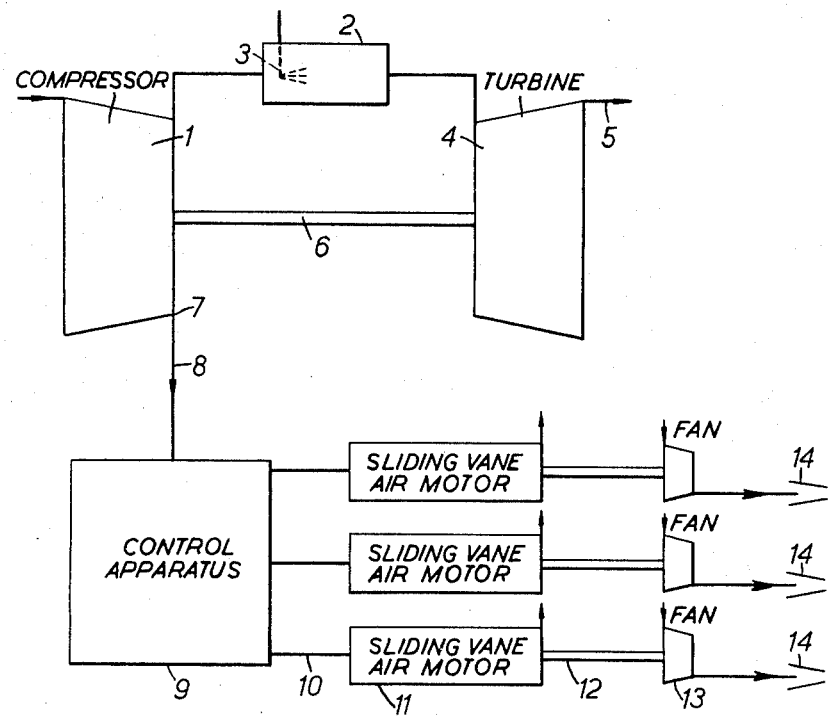
Figure 2:
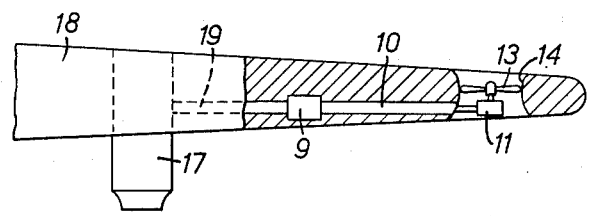

An embodiment of a plant in accordance with the invention for producing a flow of gas and for controlling the stability of an aircraft will now be described by way of example with references to the accompanying diagrammatic drawings, in which:

FIGURE 1 is a flow diagram of a stabilization and propulsion plant in accordance with the invention; and
FIGURE 2 is a fragmentary part-sectional view of an aircraft wing incorporating plant as shown in the flow diagram of FIGURE 1.

Referring to FIGURE 1, an aircraft gas-turbine unit has a compressor 1 the outlet of which communicates, via a combustion chamber 2 having a fuel injector 3, with the inlet of a turbine 4. The turbine outlet duct 5 communicates with the jet pipe of the aircraft (not shown). The compressor 1 is coupled to the turbine 4 by a shaft 6.

A bleed outlet 7 of the compressor communicates through a duct 8 with a control apparatus 9. The latter includes a sensing mechanism of known kind which detects any aircraft instability and meters the required correcting flow of compressed air to pipes 10 each of which communicates with an inlet of a sliding-vane air motor 11. Each motor 11 is coupled by a shaft 12 to a fan 13 of the axial-flow type. Each fan 13 is associated with a nozzle 14 which is arranged at an appropriate position on the aircraft structure.

In operation the gas-turbine unit can provide a forward propulsion force when required and the compressor of the unit can, under vertical flight conditions, be used to provide a metered supply of high-pressure air to individual air motors through the intermediary of the control apparatus 9. The output pressure of the fans is from 1 to 3 lb./square inch gauge.

The hereinbefore described embodiment shows connections from only one gas-turbine unit compressor to the air motor or motors. If the aircraft has more than one gas-turbine unit then it is desirable that working fluid for the air motor or motors should be derived from as many of the units as is practicable. This would reduce the possibility of loss of stability on the failure of one engine, provided that a non-return valve is included in each high-pressure air supply duct.

FIGURE 2 shows a detail of the plant of FIGURE 1 and represents diagrammatically a practical form of installation in the wing of an aircraft. A gas-turbine plant 17 partly buried in a wing 18 has a duct 19 connected from the outlet of the compressor to the control apparatus 9. The gas-turbine unit is disposed in the aircraft wing to provide vertical thrust. The control apparatus 9 feeds the air motor 11 through the pipe 10, the air motor and the fan 13 being mounted directly and concentrically in the nozzle 14.

In a modification of the arrangement of FIGURE 2, two or more nozzles are grouped together and each has an individual sliding-vane air motor and fan.

The fan of the sliding vane air motor and fan combination can be employed as an anti-torque rotor of a helicopter.

The use of a sliding vane air motor to drive a fan used for aircraft stabilization gives rise to the advantages of a small inertia for the moving parts, a quick response to change of conditions, high operational efficiency in the small sizes required for stabilization purposes, good control over a wide speed range and correct matching of the fan to its power source.

In either of the hereinbefore described embodiments the exhaust air from the air motor or motors may be used to supply a part of the working fluid for the control nozzles instead of being exhausted directly to atmosphere.

I claim:
1. A stabilization and propulsion plant for an aircraft including
   (a) a propulsion gas turbine unit incorporating compression means;
   (b) a variable flow control apparatus having a fluid inlet and a fluid outlet and incorporating a sensing mechanism to detect instability in aircraft flight attitude and for variably metering flow through said control apparatus in response to said instability;
   (c) ducting to lead a quantity of compressed fluid from the compression means to the control apparatus;
   (d) a sliding vane air motor;
   (e) ducting to lead a metered quantity of pressurized fluid from the control apparatus to the sliding vane air motor;
   (f) an axial-flow rotary fan having a constant blade pitch angle;
   (g) a shaft coupling the sliding vane air motor and the axial-flow rotary fan;
   (h) at least one nozzle to provide stability control for the aircraft, and
   (i) means to lead pressurized air from the axial-flow fan to the nozzle.
2. A stabilization and propulsion plant for an aircraft capable of taking off and landing substantially vertically including
   (a) a propulsion gas turbine unit incorporating compression means;
   (b) a variable flow control apparatus having a fluid inlet and a fluid outlet and incorporating a sensing mechanism to detect instability in aircraft flight attitude and for variably metering flow through said control apparatus in response to said instability;
   (c) ducting to lead a quantity of compressed fluid from the compression means to the control apparatus;

(d) a sliding vane air motor;
(e) ducting to lead a metered quantity of pressurized fluid from the control apparatus to the sliding vane air motor;
(f) an axial-flow rotary fan having a constant blade pitch angle;
(g) a shaft coupling the sliding vane air motor and the axial-flow rotary fan;
(h) at least one nozzle to provide stability control for the aircraft, and
(i) means to lead pressurised air from the axial-flow fan to the nozzle.

3. A stabilization and propulsion plant for an aircraft including
(a) a propulsion gas turbine unit incorporating compression means;
(b) a variable flow control apparatus having a fluid inlet and a fluid outlet and incorporating a sensing mechanism to detect instability in aircraft flight attitude and for variably metering flow through said control apparatus in response to said instability;
(c) ducting to lead a quantity of compressed fluid from the compression means to the control apparatus;
(d) a plurality of sliding vane air motors;
(e) ducting to lead metered quantities of pressurized fluid from the control apparatus to each of the sliding vane air motors;
(f) a plurality of axial-flow rotary fans each having constant blade pitch angle;
(g) shafts coupling the sliding vane air motors to the axial-flow rotary fans;
(h) a plurality of nozzles to provide stability control for the aircraft, and
(i) means to lead pressurized air from each axial-flow rotary fan to at least one of the nozzles.

4. A stabilization and propulsion plant for an aircraft including
(a) a propulsion gas turbine unit incorporating compression means;
(b) a variable flow control apparatus having a fluid inlet and a fluid outlet and incorporating a sensing mechanism to detect instability in aircraft flight attitude and for variably metering flow through said control apparatus in response to said instability;
(c) ducting to lead a quantity of compressed fluid from the compression means to the control apparatus;
(d) a plurality of sliding vane air motors;
(e) ducting to lead metered quantities of pressurized fluid from the control apparatus to each of the sliding vane air motors;
(f) a plurality of axial-flow rotary fans each having constant blade pitch angle;
(g) shafts coupling the sliding vane air motors to the axial-flow rotary fans;
(h) a plurality of nozzles to provide stability control for the aircraft;
(i) each air motor and the fan coupled thereto being mounted within one of the nozzles.

References Cited by the Examiner

UNITED STATES PATENTS

| | | | |
|---|---|---|---|
| 2,899,940 | 8/1959 | Gibbs et al. | 91—140 X |
| 2,926,868 | 3/1960 | Taylor | 244—12 |
| 2,930,544 | 3/1960 | Howell | 244—12 |
| 2,940,689 | 6/1960 | Howell | 244—12 |
| 2,990,138 | 6/1961 | Shaw | 244—12 |
| 3,056,565 | 10/1962 | Griffith | 60—39.16 X |
| 3,061,241 | 10/1962 | Holland | 244—52 X |
| 3,120,362 | 2/1964 | Curtis et al. | 244—52 |

OTHER REFERENCES

Keith-Lucas, D.: "Safety and Reliability Aspects of VTOL," Advances in Aeronautical Sciences, volume 2, Pergamon Press, N.Y., 1959, pages 893, 894 and 896 relied on. TL 505 I 54.

MARK NEWMAN, *Primary Examiner.*

SAM LEVINE, *Examiner.*